US012795522B2

(12) United States Patent
Lee et al.

(10) Patent No.: US 12,795,522 B2
(45) Date of Patent: Nov. 10, 2026

(54) METHOD FOR TRANSMITTING AUDIO DATA BY USING SHORT-RANGE WIRELESS COMMUNICATION IN WIRELESS COMMUNICATION SYSTEM, AND APPARATUS FOR SAME

(71) Applicant: LG ELECTRONICS INC., Seoul (KR)

(72) Inventors: Hyeonjae Lee, Seoul (KR); Minsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 376 days.

(21) Appl. No.: 18/569,897

(22) PCT Filed: Jun. 16, 2022

(86) PCT No.: PCT/KR2022/008558
§ 371 (c)(1),
(2) Date: Dec. 13, 2023

(87) PCT Pub. No.: WO2022/265433
PCT Pub. Date: Dec. 22, 2022

(65) Prior Publication Data
US 2024/0276354 A1 Aug. 15, 2024

(30) Foreign Application Priority Data
Jun. 17, 2021 (KR) ........................ 10-2021-0078847

(51) Int. Cl.
*H04W 48/16* (2009.01)
*H04W 48/10* (2009.01)
*H04W 76/10* (2018.01)

(52) U.S. Cl.
CPC .......... *H04W 48/16* (2013.01); *H04W 48/10* (2013.01); *H04W 76/10* (2018.02)

(58) Field of Classification Search
None
See application file for complete search history.

(56) References Cited

U.S. PATENT DOCUMENTS 10,432,771 B2 * 10/2019 Kyou ................ H04M 1/72412
2008/0268922 A1 * 10/2008 Tamura ............... H04M 1/6066
455/575.2

(Continued)

FOREIGN PATENT DOCUMENTS

KR 10-2017-0097159 8/2017
KR 10-1783311 9/2017

(Continued)

OTHER PUBLICATIONS

PCT International Application No. PCT/KR2022/008558, International Search Report dated Sep. 21, 2022, 4 pages.

*Primary Examiner* — Brian S Roberts
(74) *Attorney, Agent, or Firm* — LEE, HONG, DEGERMAN, KANG & WAIMEY

(57) ABSTRACT

The present specification relates to a method by which a source device transmits audio data in a short-range wireless communication system, and to an apparatus for same. The method proposed in the present specification comprises the steps of: establishing a connection with a sink device; performing a setup procedure for transmitting the audio data with the sink device on the basis of the established connection; and transmitting, to the sink device, the audio data on the basis of the setup procedure, wherein the steps of performing a setup procedure further comprises a step of transmitting, to the sink device, timing information on a transmission timing of the audio data and metadata information for transmission of the audio data, and the audio data is transmitted without transmission of a periodic advertisement message for transmitting the timing information and the metadata information.

14 Claims, 13 Drawing Sheets

(56) References Cited

U.S. PATENT DOCUMENTS

| | | | | |
|---|---|---|---|---|
| 2016/0359925 | A1 | 12/2016 | Song | |
| 2017/0279808 | A1* | 9/2017 | Kwon | H04W 76/10 |
| 2017/0303076 | A1* | 10/2017 | Song | H04W 4/80 |
| 2019/0141786 | A1* | 5/2019 | Park | H04W 4/80 |
| 2019/0327661 | A1* | 10/2019 | Li | H04W 76/10 |
| 2019/0364075 | A1* | 11/2019 | Huang | H04L 65/00 |
| 2022/0201452 | A1* | 6/2022 | Lee | H04B 5/77 |
| 2024/0396849 | A1* | 11/2024 | Lee | H04L 12/40 |

FOREIGN PATENT DOCUMENTS

| | | |
|---|---|---|
| KR | 10-1910067 | 10/2018 |
| KR | 10-2020-0106742 | 9/2020 |

* cited by examiner

【FIG. 1】
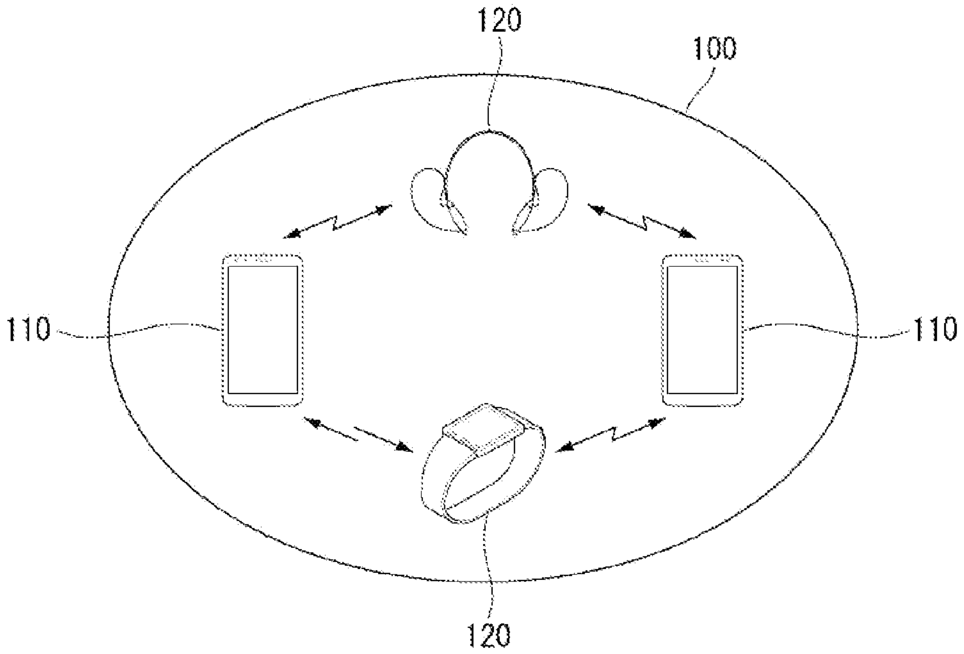

【FIG. 2】
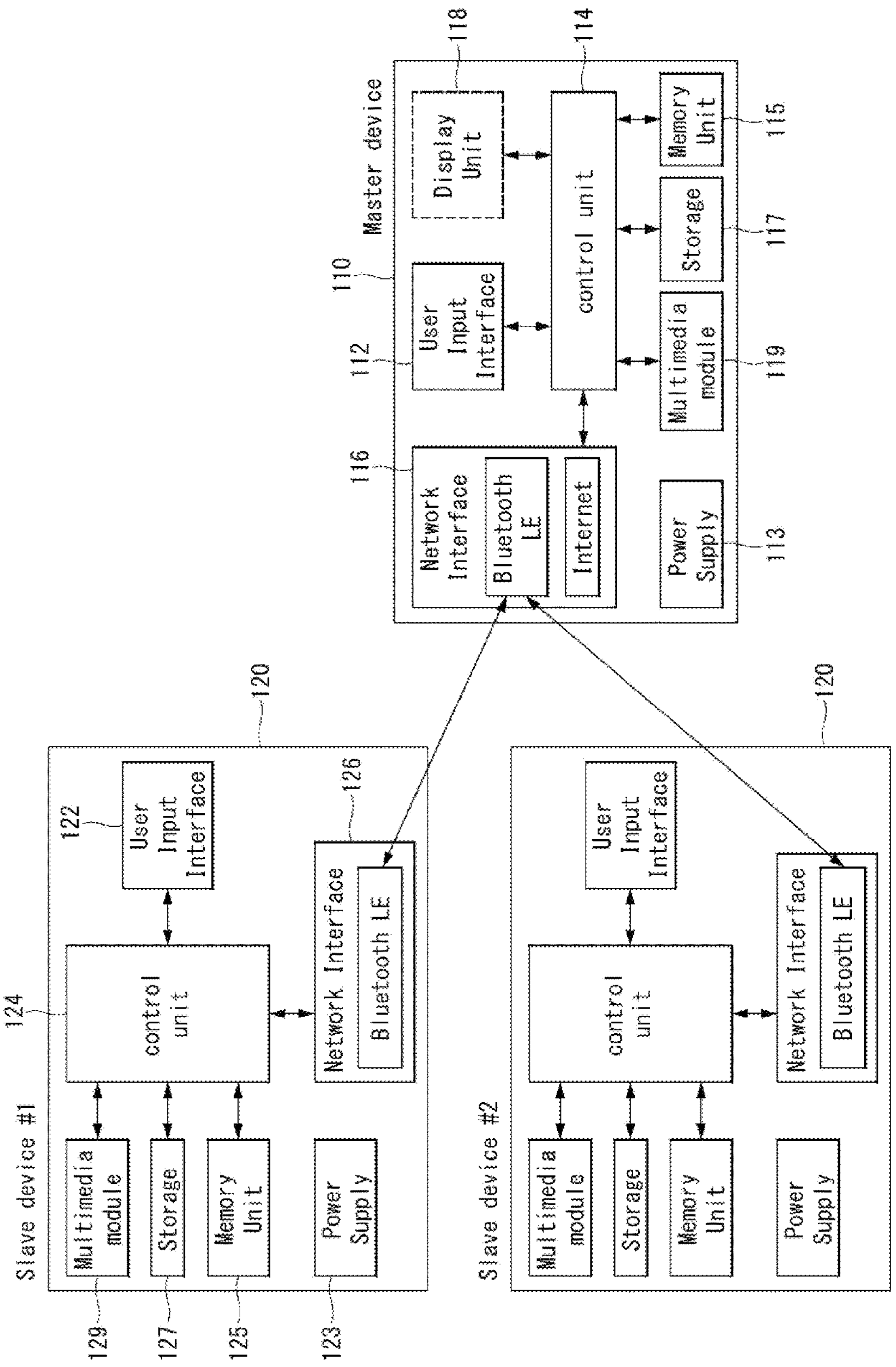

【FIG. 3】
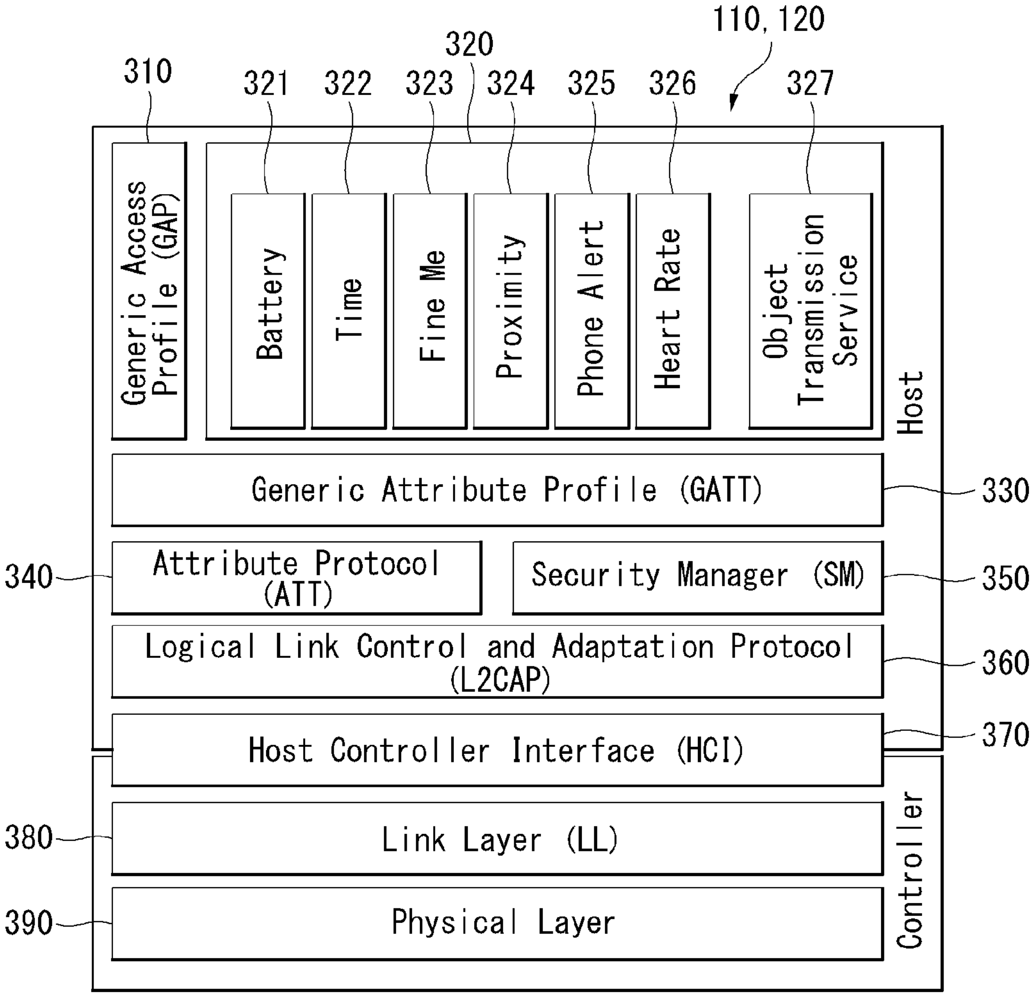

【FIG. 4】
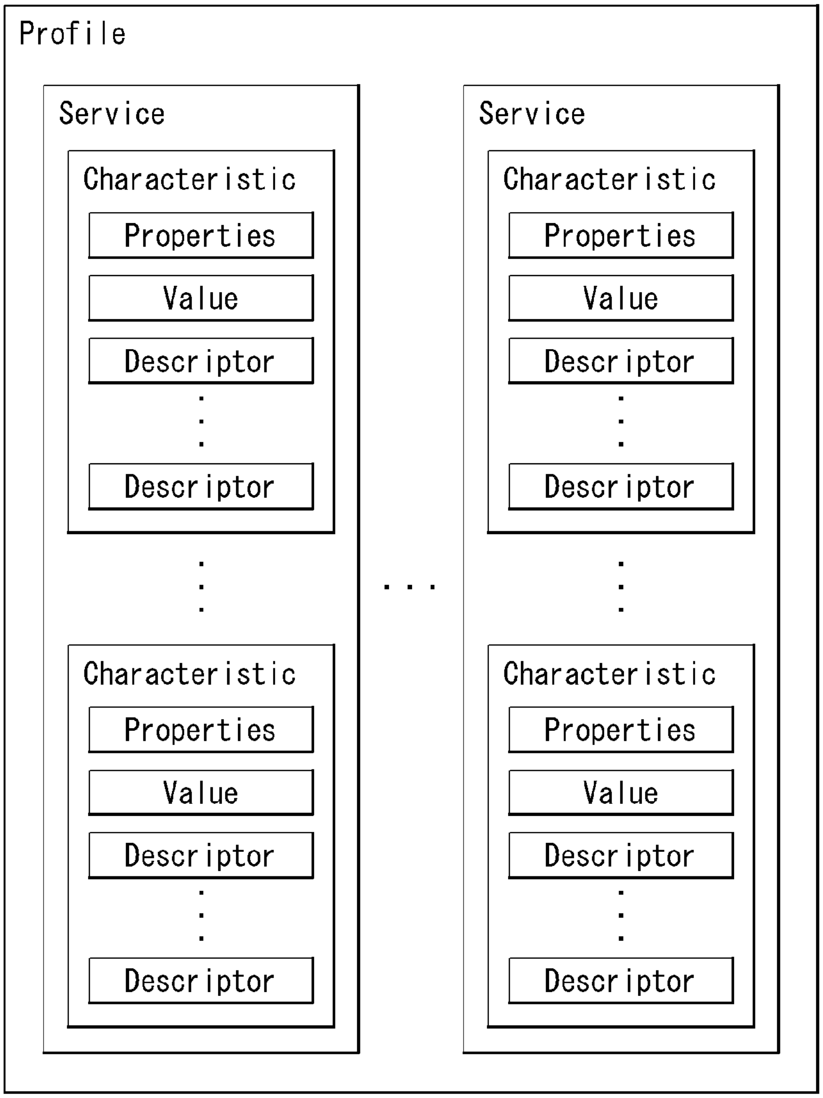

【FIG. 5】
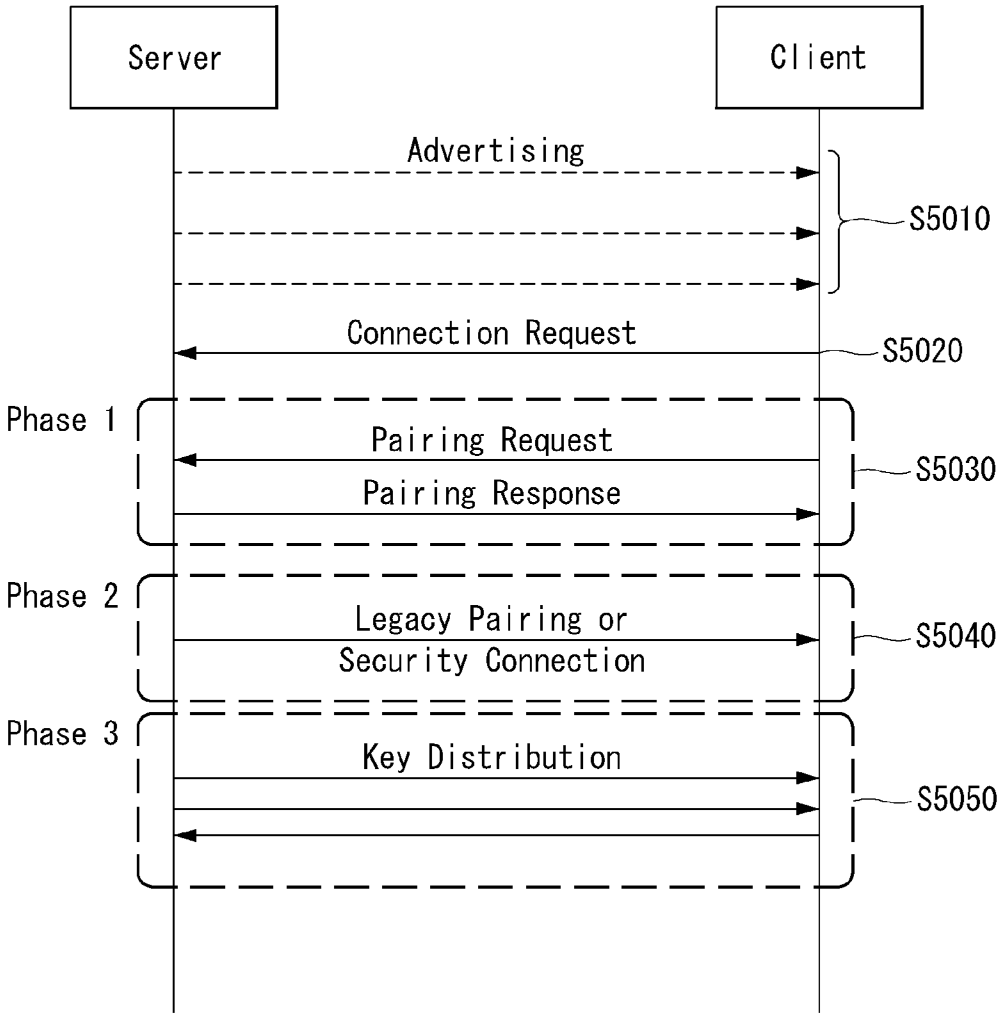

【FIG. 6】
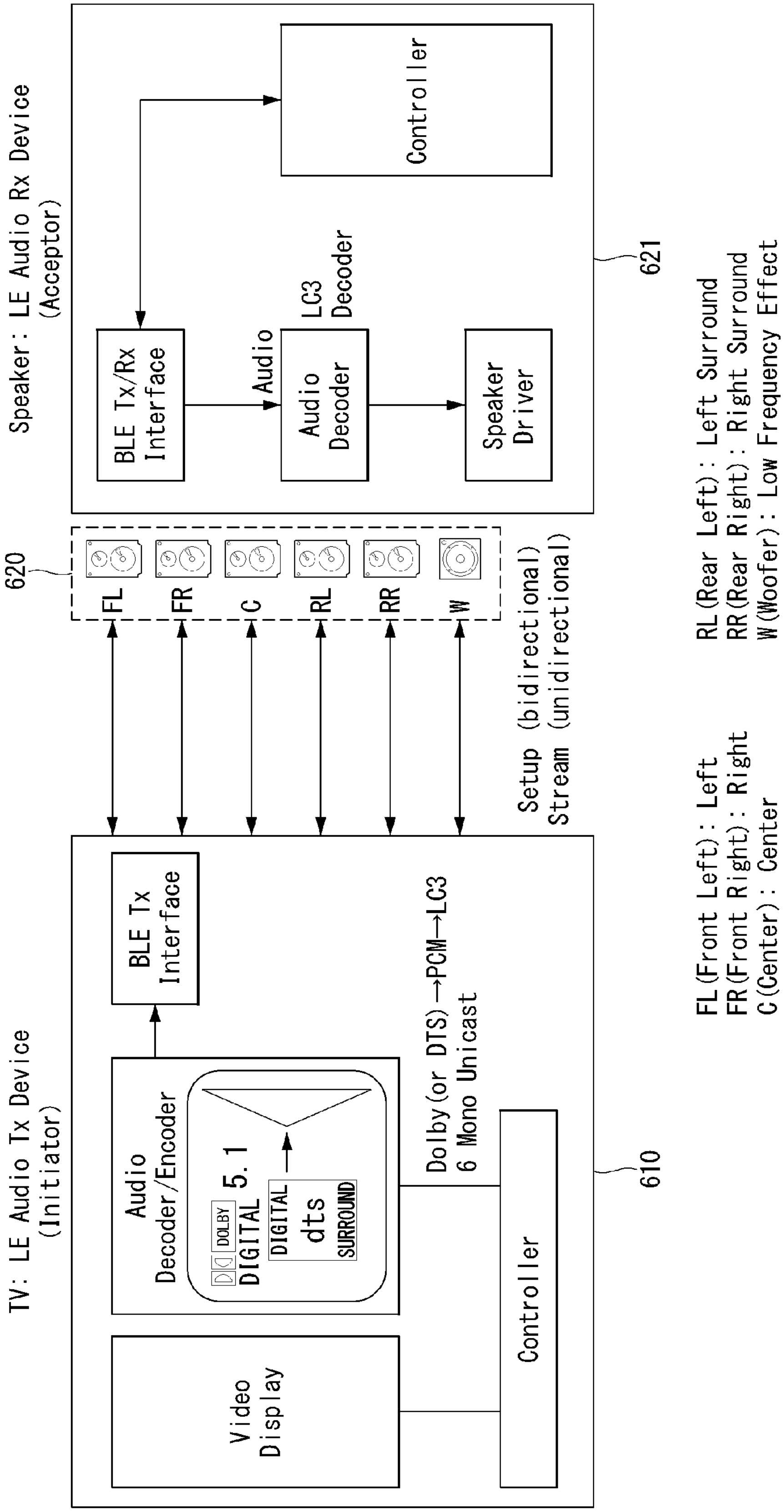

【FIG. 7】
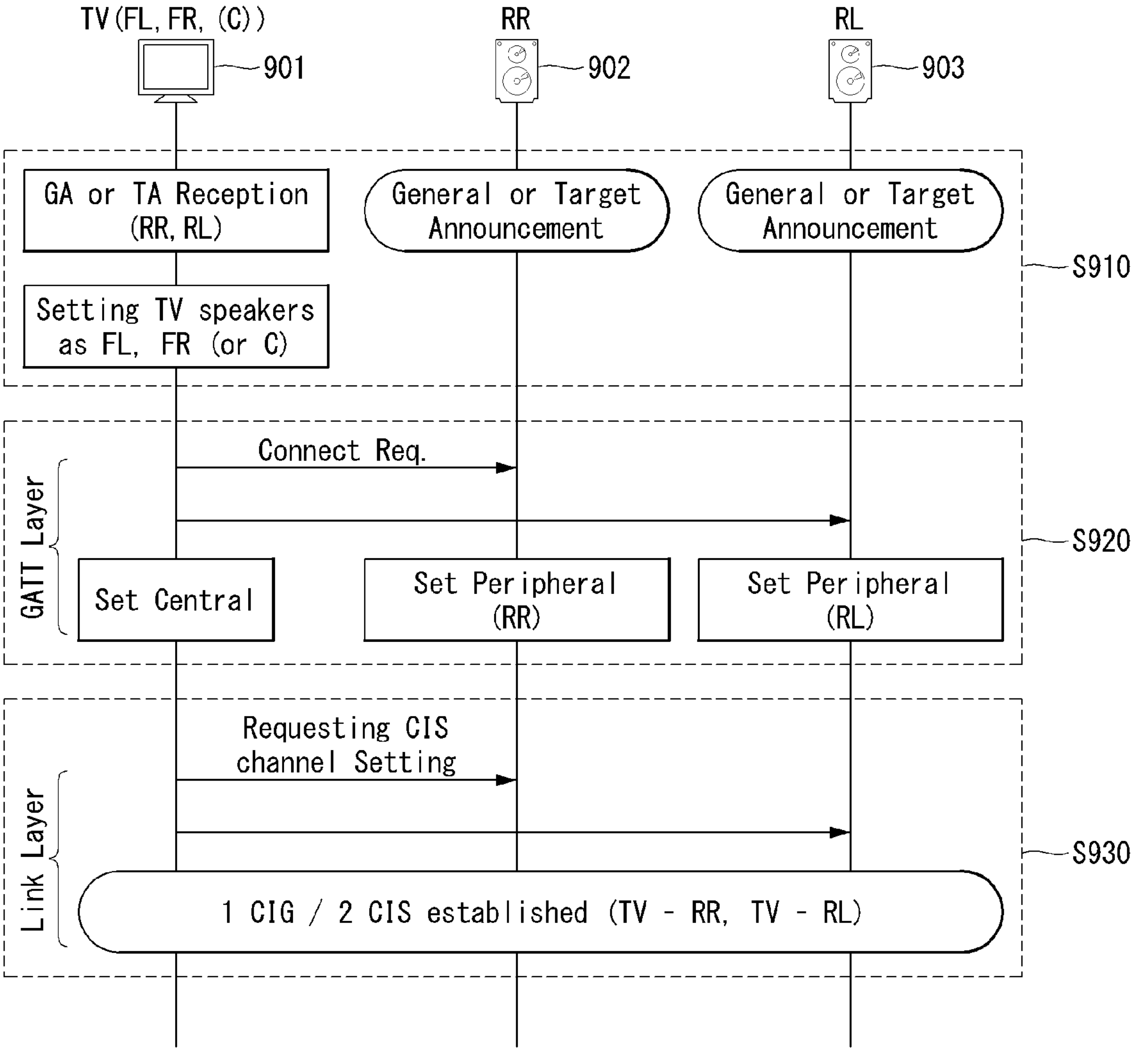

【FIG. 8】
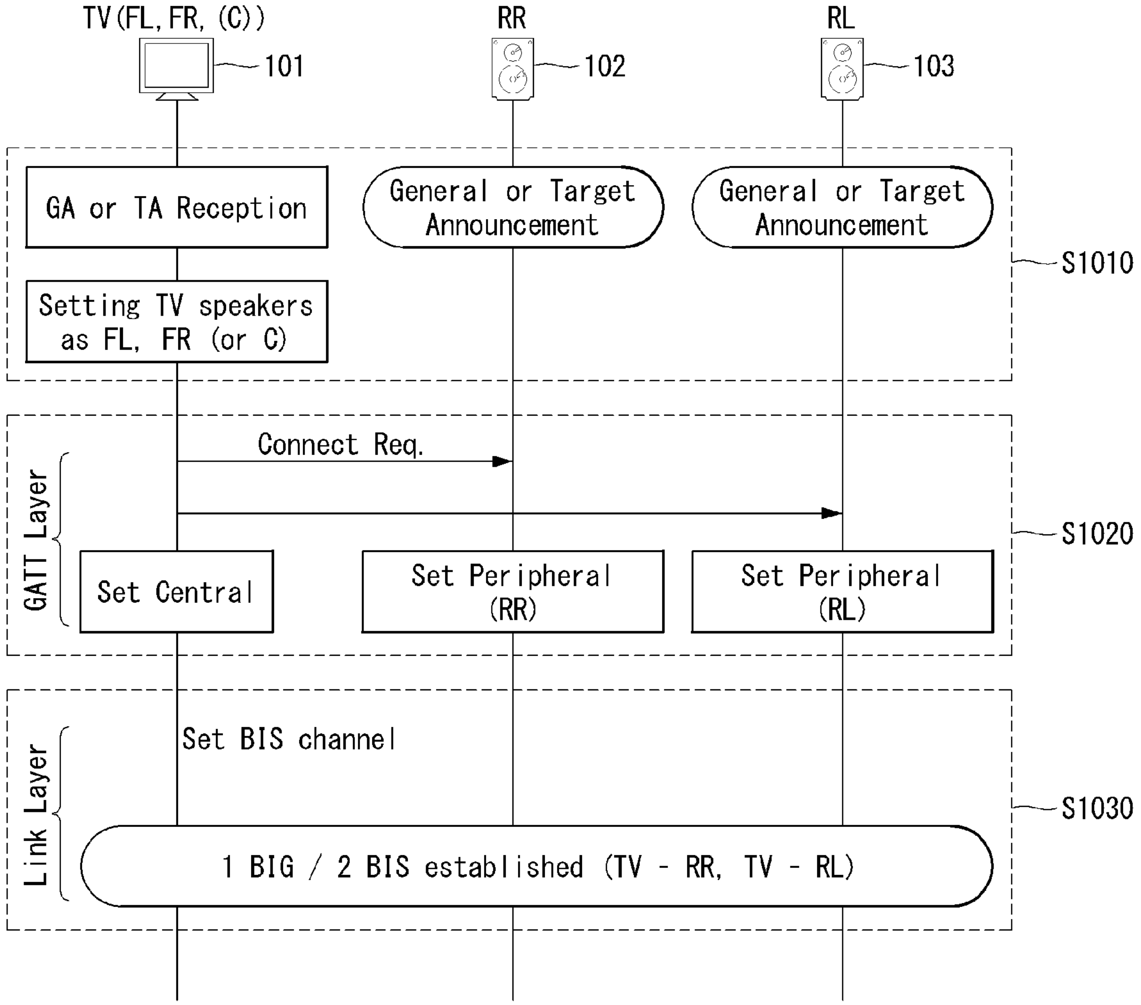

【FIG. 9】
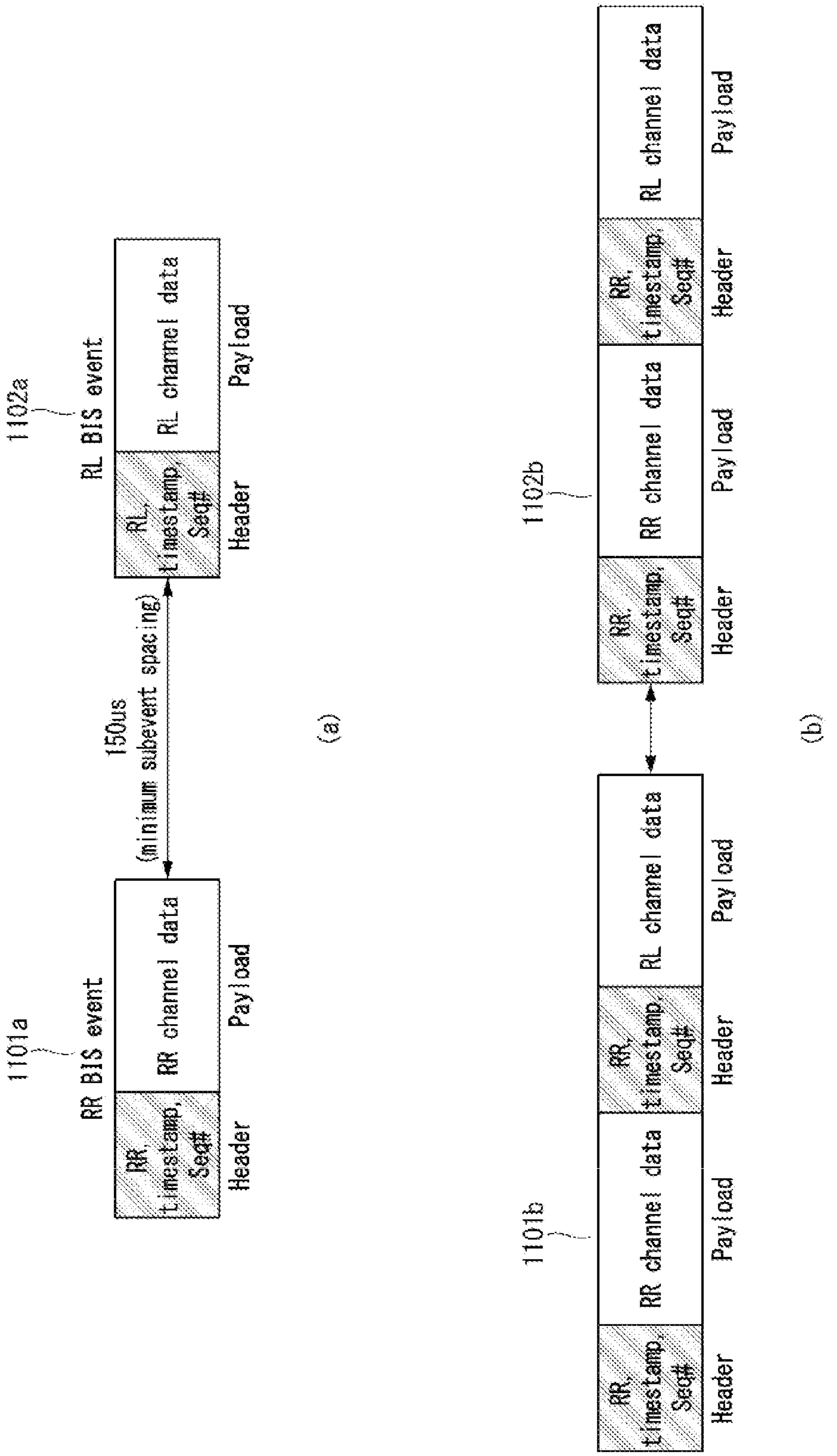

【FIG. 10】
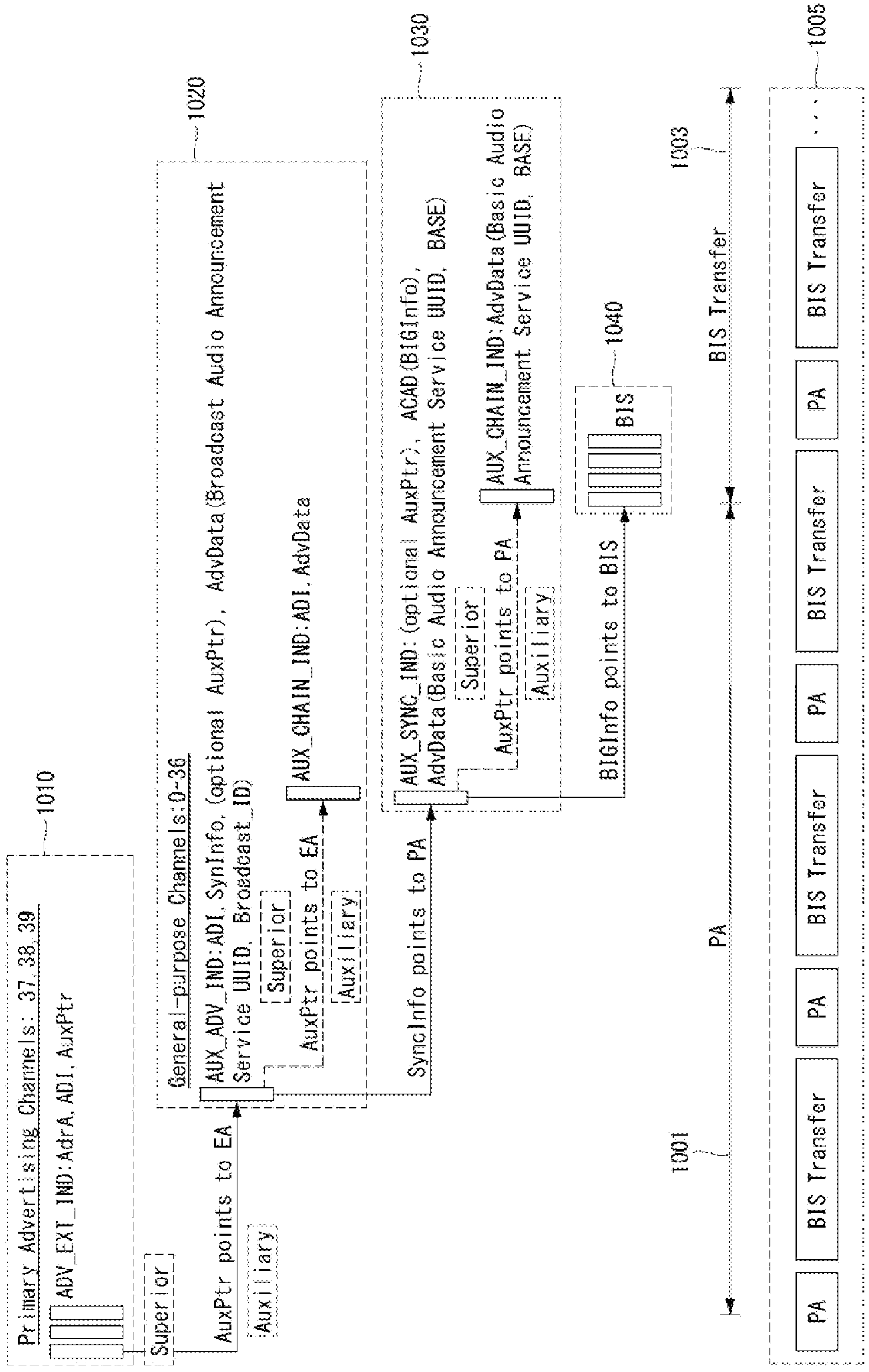

【FIG. 11】
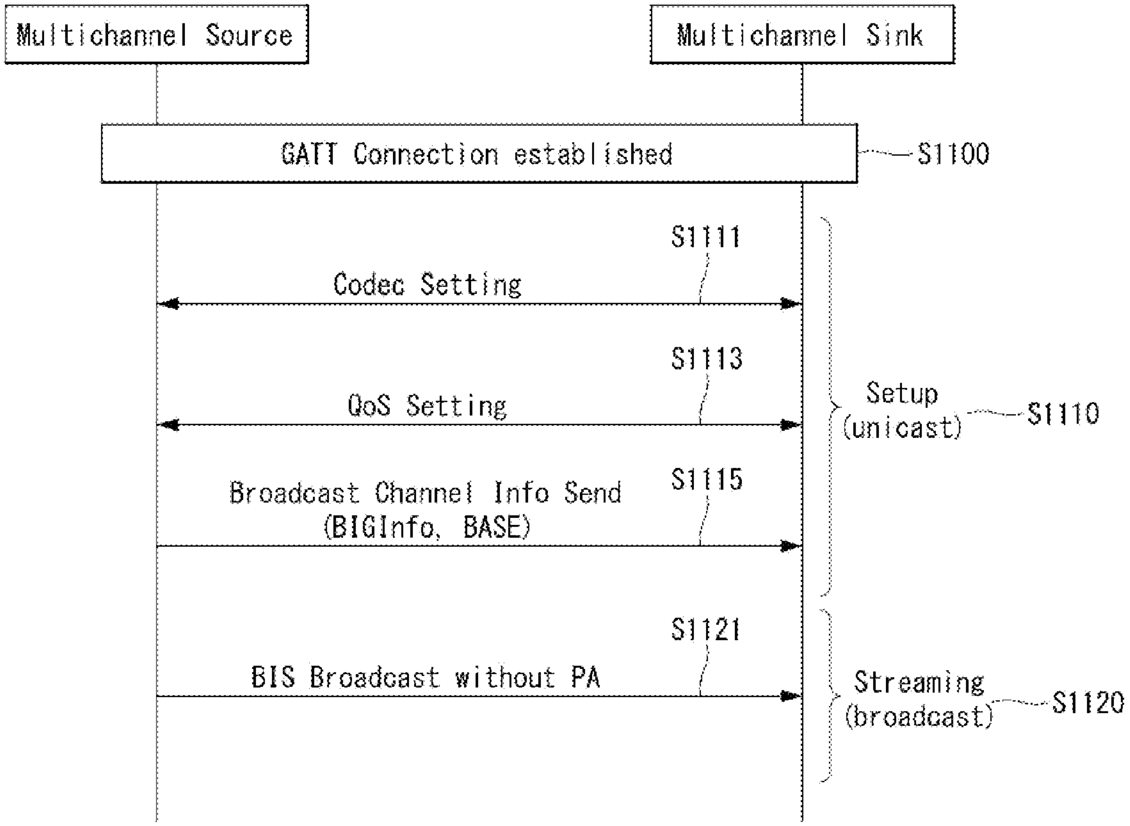

【FIG. 12】
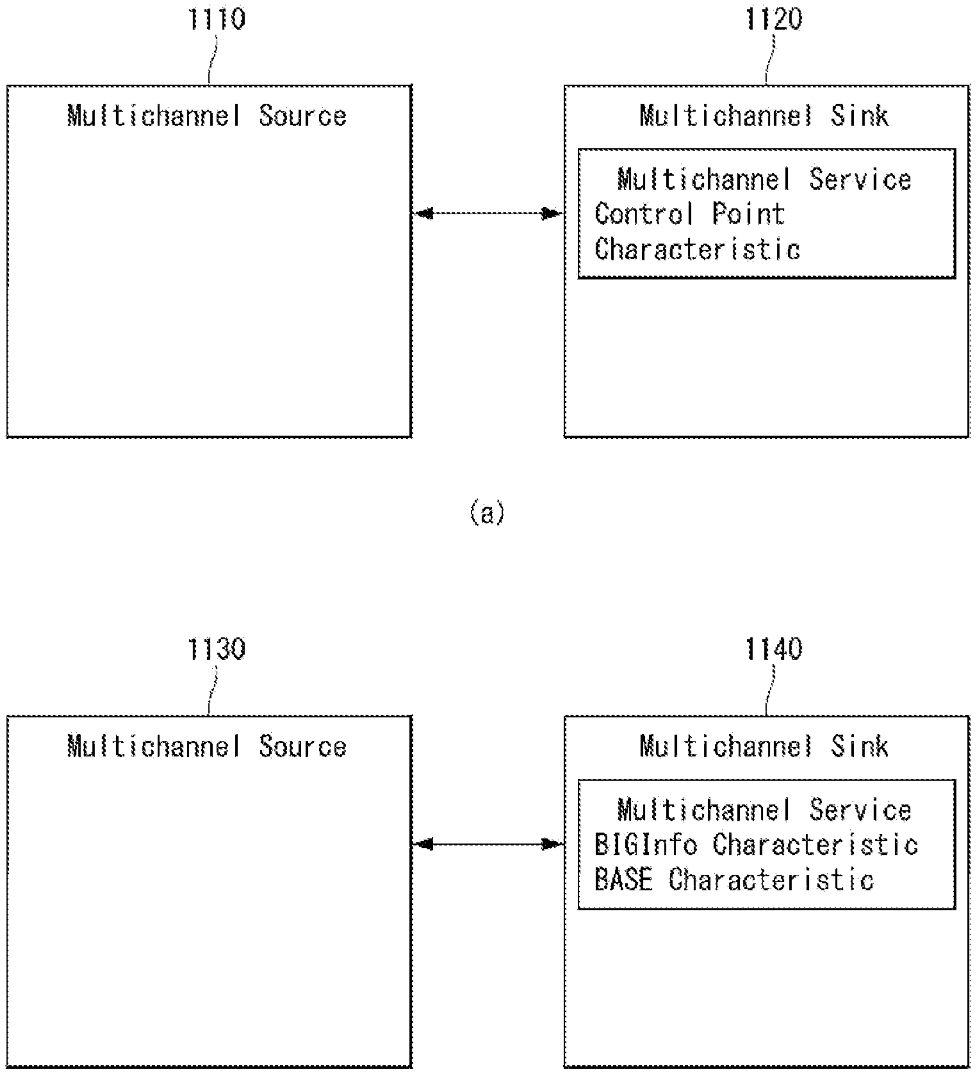
(b)

【FIG. 13】
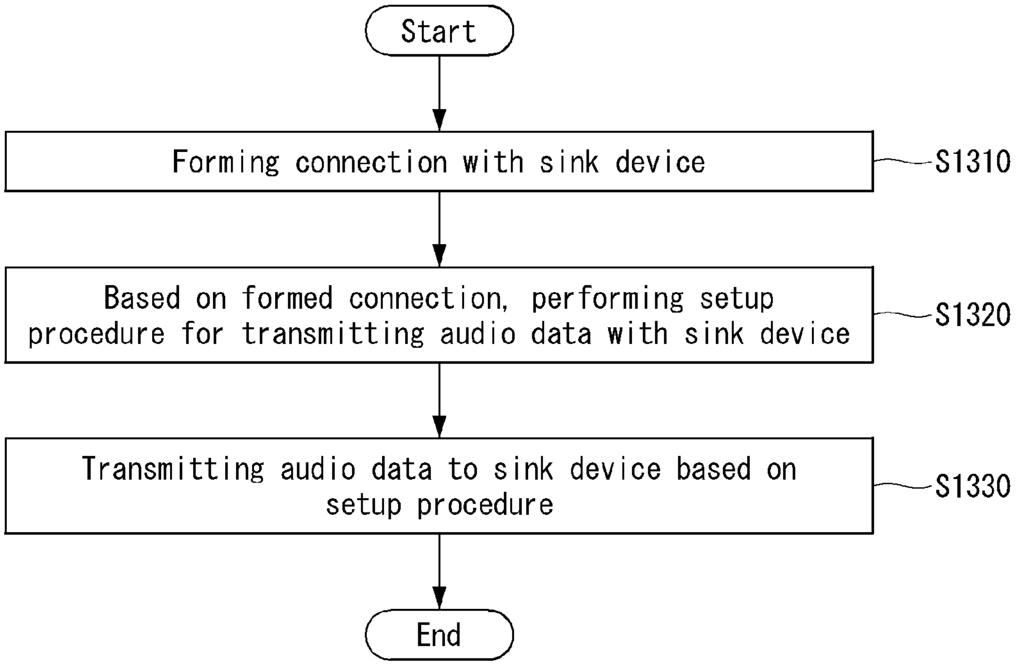

METHOD FOR TRANSMITTING AUDIO DATA BY USING SHORT-RANGE WIRELESS COMMUNICATION IN WIRELESS COMMUNICATION SYSTEM, AND APPARATUS FOR SAME

CROSS-REFERENCE TO RELATED APPLICATIONS

This application is the National Stage filing under 35 U.S.C. 371 of International Application No. PCT/KR2022/008558, filed on Jun. 16, 2022, which claims the benefit of earlier filing date and right of priority to Korean Application No. 10-2021-0078847, filed on Jun. 17, 2021, the contents of which are all hereby incorporated by reference herein in their entireties.

TECHNICAL FIELD

The present disclosure relates to a wireless communication system, and particularly to a method for transmitting audio data using short-range wireless communication and an apparatus for the same.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term “device” refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

The purpose of the present disclosure is to provide a method for transmitting audio data using Bluetooth low energy in a short-range wireless communication system, and an apparatus for the same.

In addition, the purpose of the present disclosure is to provide a method for performing audio data broadcast streaming without transmission of periodic advertising messages when transmitting audio data using Bluetooth low energy in a short-range wireless communication system, and an apparatus for the same.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

The present disclosure proposes a method for transmitting audio data by a source device in a short-range wireless communication system, and an apparatus for the same.

More specifically, in the present disclosure, a method for transmitting audio data by a source device in a short-range wireless communication system, the method comprises forming a connection with a sink device; based on the formed connection, performing a setup procedure for transmitting the audio data with the sink device; and transmitting the audio data to the sink device based on the setup procedure, wherein the performing the setup procedure further includes transmitting, to the sink device, timing information on transmission timing of the audio data and metadata information for transmission of the audio data, and the audio data is transmitted without transmission of periodic advertisement messages for transmission of the timing information and the metadata information.

In addition, in the present disclosure, the metadata information may include information for setting codec used to output the audio data by the sink device.

In addition, in the present disclosure, the metadata information may further include information on a number of channels for transmission of the audio data.

In addition, in the present disclosure, the metadata information may further include information on video data related to the audio data.

In addition, in the present disclosure, the timing information may further include channel setup information for transmission of the audio data.

In addition, in the present disclosure, the channel setup information may include (i) information on time interval of channels for transmission of the audio data, (ii) information on sub-time intervals constituting the time interval, (iii) information on a number of the sub-time intervals included in the time interval, and (iv) information on a number of new events transmitted in the time interval.

In addition, in the present disclosure, the timing information may further include encryption information for encrypting the audio data.

In addition, in the present disclosure, the transmitting timing information on transmission timing of the audio data and metadata information for transmission of the audio data, may be performed based on a control point characteristic defined in the source device and the sink device.

In addition, in the present disclosure, a separate characteristic for transmitting timing information on transmission timing of the audio data and metadata information for transmission of the audio data may be defined in the source device and the sink device.

In addition, the present disclosure may further include receiving, from the sink device, a notification message indicating that setup of the sink device based on the timing information and the metadata information has been completed.

In addition, the present disclosure may further include receiving, from the sink device, a message requesting a change in the setup of the sink device based on the setup procedure.

In addition, in the present disclosure, the transmission of the audio data may be stopped based on the reception of the message requesting a change in the setup of the sink device.

In addition, the present disclosure may further include performing a setup change procedure to change setup of the sink device and the sink device; and receiving, from the sink device, a notification message indicating that change of the setup of the sink device has been completed.

In addition, the present disclosure may further include transmitting, to the sink device, the audio data based on the changed setup of the sink device.

In addition, in the present disclosure, a source device that transmits audio data in a short-range wireless communication system comprises a transmitter configured to transmit a wireless signal; a receiver configured to receive a wireless signal; at least one processor; and at least one computer memory operably connected to the at least one processor, and storing instructions for performing operations when being executed by the at least one processor, wherein the operations includes forming a connection with a sink device; based on the formed connection, performing a setup procedure for transmitting the audio data with the sink device; and transmitting the audio data to the sink device based on the setup procedure, wherein the performing the setup procedure further includes transmitting, to the sink device, timing information on transmission timing of the audio data and metadata information for transmission of the audio data, and the audio data is transmitted without transmission of periodic advertisement messages for transmission of the timing information and the metadata information.

Advantageous Effects

The present disclosure has an effect of transmitting audio data using Bluetooth low energy in a short-range wireless communication system.

In addition, the present disclosure has an effect of reducing bandwidth resource waste by performing audio data broadcast streaming without transmission of periodic advertising messages when transmitting audio data using Bluetooth low energy in a short-range wireless communication system.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included as part of the detailed description to aid understanding of the present disclosure, provide embodiments of the present disclosure and describe technical features of the present disclosure along with the detailed description.

FIG. 1 is a schematic view illustrating an example of a wireless communication system using a Bluetooth low energy technology to which the present disclosure is applicable.

FIG. 2 illustrates an example of an internal block diagram of a device capable of implementing methods described in the present disclosure.

FIG. 3 illustrates an example of Bluetooth communication architecture to which methods described in the present disclosure is applicable.

FIG. 4 illustrates an example of a structure of a generic attribute profile (GATT) of Bluetooth low energy.

FIG. 5 is a flowchart showing an example of a connection procedure method in Bluetooth low energy technology to which the present disclosure is applicable.

FIG. 6 is a diagram illustrating an example of a 5.1 channel surround sound system consisting of a TV and speakers.

FIG. 7 is a flowchart illustrating an example of an operation performed between a TV with built-in speakers and two speakers in a 5.1-channel surround sound system.

FIG. 8 is a flowchart illustrating an example of an operation performed between a TV with built-in speakers and two speakers in a 5.1-channel surround sound system.

FIG. 9 is a diagram illustrating examples of data packet formats transmitted through a BIS channel.

FIG. 10 illustrates an example of an operation in which a source device transmits audio data to a sink device.

FIG. 11 is a diagram illustrating an example in which a method proposed in the present disclosure is performed between a source device and a sink device.

FIG. 12 is a diagram illustrating examples for characteristic configurations for implementing a method proposed in the present disclosure.

FIG. 13 is a flowchart illustrating an example of a source device operation performing a method proposed in the present disclosure.

MODE FOR INVENTION

In order to help understanding of the present disclosure, the accompanying drawings which are included as a part of the Detailed Description provide embodiments of the present disclosure and describe the technical features of the present disclosure together with the Detailed Description. Like reference numerals principally designate like elements throughout the disclosure. Further, in describing the present disclosure, a detailed explanation of known related technologies may be omitted to avoid unnecessarily obscuring the subject matter of the present disclosure. Further, it is noted that the accompanying drawings are only for easily understanding the spirit of the present disclosure and it should not be interpreted that the spirit of the present disclosure is limited by the accompanying drawings.

Hereinafter, a method and an apparatus related with the present disclosure will be described in more detail with reference to drawings. In addition, a general term used in the present disclosure should be interpreted as defined in a dictionary or contextually, and should not be interpreted as an excessively reduced meaning. Further, a singular form used in the present disclosure may include a plural form if there is no clearly opposite meaning in the context. In the present application, a term such as "comprising" or "including" should not be interpreted as necessarily including all various components or various steps disclosed in the disclosure, and it should be interpreted that some component or some steps among them may not be included or additional components or steps may be further included. Suffixes "unit", "module", and "section" for components used in the following description are given or mixed in consideration of easy preparation of the disclosure only and do not have their own distinguished meanings or roles. The terms "first", "second", and the like are used to differentiate a certain component from other components, but the scope of should not be construed to be limited by the terms.

FIG. 1 is a schematic view illustrating an example of a wireless communication system using a Bluetooth low energy technology to which the present disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notice/notification message and an indication message to the client device in order to provide data information to the client device. In addition, when the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

FIG. 2 illustrates an example of an internal block diagram of a device capable of implementing methods described in the present disclosure.

As illustrated in FIG. 2, the master device 110 includes a user input interface 112, a power supply unit 113, a control unit 114, a memory unit 115, a network interface 116 including a Bluetooth interface, a storage 117, a display unit 118, and a multimedia module 119.

The user input interface 112, the power supply unit 113, the control unit 114, the memory unit 115, the network interface 116 including the Bluetooth interface, the storage 117, the display unit 118, and the multimedia module 119 are functionally connected to each other to perform methods described in the present disclosure.

Further, as illustrated in FIG. 2, a slave device (#1 and #2) 120 includes a user input interface 122, a power supply unit 123, a control unit 124, a memory unit 125, a network interface 126 including a Bluetooth interface, a storage 127, a display unit 128, and a multimedia module 129.

The user input interface 122, the power supply unit 123, the control unit 124, the memory unit 125, the network interface 126 including the Bluetooth interface, the storage 127, the display unit 128, and the multimedia module 129 are functionally connected to each other to perform methods described in the present disclosure.

The network interfaces 116 and 126 refer to units (or modules) capable of transmitting requests/responses, commands, notifications, indication/confirmation messages, etc., or data between devices using Bluetooth technology.

The memory units 115 and 125 refer to units implemented in various types of devices and refer to units in which various types of data are stored. The storages 117 and 127 refer to units that perform a function similar to a function of a memory.

The control units 114 and 124 refer to modules that control the overall operation of the master device 110 or the slave device 120, and request to transmit a message to the network interface or control to process a received message.

The control units 114 and 124 may include an application-specific integrated circuit (ASIC), another chipset, a logic circuit, and/or a data processing device.

The memory units 115 and 125 may include a read-only memory (ROM), a random access memory (RAM), a flash memory, a memory card, a storage medium, and/or other storage devices.

The memory units 115 and 125 may be inside or outside the processors 114 and 124 and may be connected to the processors 114 and 124 by various well-known means.

The display units 118 and 128 refer to modules for providing status information and message exchange information of the device to a user through a screen.

The power supply units 113 and 123 refers to modules that receive external power and internal power under the control of the control unit and supply power necessary for the operation of each component.

As discussed above, the BLE technology has a small duty cycle and can greatly reduce power consumption through a low data transfer rate.

FIG. 3 illustrates an example of Bluetooth communication architecture to which methods described in the present disclosure is applicable.

Specifically, FIG. 3 illustrates an example of architecture of Bluetooth low energy (LE).

As illustrated in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth disclosure using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service

④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.

Time: A method for exchanging time information.

FindMe: A method for providing an alarm service according to the distance.

Proximity: A method for exchanging battery information.

Time: A method for exchanging time information

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCl) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption may be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE disclosure, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices may scan the discoverable device through an advertising (or broadcast) physical channel.

Both of the discovering device and the discoverable device may already have been connected to other Bluetooth devices in a piconet Connecting Procedure A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for “scanWindow” duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for “scanWindow” duration.

Connection State

The link layer enters a connection state when the device performing the connection request, i. E., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave. The master controls a timing of a connection event and the connection event refers to a time at which the master and the slave are synchronized.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type field of an advertising channel included in the header supports PDU types defined in Table 1 below.

TABLE 1

| | | | Permitted PHYs | | |
|---|---|---|---|---|---|
| PDU Type | PDU Name | Channel | LE 1M | LE 2M | LE Coded |
| 0000b | ADV_IND | Primary Advertising | • | | |
| 0001b | ADV_DIRECT_IND | Primary Advertising | • | | |
| 0010b | ADV_NONCONN_IND | Primary Advertising | • | | |
| 0011b | SCAN_REQ | Primary Advertising | • | | |
| | AUX_SCAN_REQ | Secondary Advertising | • | • | • |
| 0100b | SCAN_RSP | Primary Advertising | • | | |
| 0101b | CONNECT_IND | Primary Advertising | • | | |
| | AUX_CONNECT_REQ | Secondary Advertising | • | • | • |
| 0110b | ADV_SCAN_IND | Primary Advertising | • | | |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by the present disclosure.

FIG. 4 illustrates an example of a structure of a generic attribute profile (GATT) of Bluetooth low energy.

Referring to FIG. 4, a structure for exchanging profile data of the Bluetooth low energy may be described.

Specifically, the generic attribute profile (GATT) is a definition of a method in which data is transmitted and received by using services and characteristics between the Bluetooth LE devices.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

A GATT-based operation structure used in the Bluetooth LE may be based on THE profile, the service, and the characteristic, and may have a vertical structure illustrated in FIG. 4.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.

handle: Address of attribute

Type: Type of attribute

Value: Value of attribute

Permission: Access authority to attribute

FIG. 5 is a flowchart showing an example of a connection procedure method in Bluetooth low energy technology to which the present disclosure may be applied.

A server transmits to a client an advertisement message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smartphone, etc.

As described above, in Bluetooth, communication is performed over a total of 40 channels through the 2.4 GHz band. Three channels among 40 channels as the advertising channels are used for exchanging sent and received for establishing the connection, which include various advertising packets.

The remaining 37 channels are used for data exchange after connection to the data channel.

The client may receive the advertisement message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.

Temporary Key: Key made for creating the STK

Short Term Key (LTK): Key value used for making encrypted connection between devices When the secure connection is performed in Phase 2, a 128-bit long term key (LTK) is generated.

Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by forming the encrypted link.

A 5.1-channel surround sound system refers to a 6-channel surround sound audio system using 6 speakers. In a 5.1-channel surround sound system, five full-band channels and one low-frequency effects channel are used.

Recently, the number of contents supported through 5.1-channel surround sound systems (for example, streaming contents such as Blue-ray disc or Netflix) has been increasing. However, in order to support a 5.1 channel surround sound system, there is the inconvenience of requiring the user to install six speakers themselves, making it difficult to actively utilize the 5.1 channel surround sound system. However, as audio technology support using Bluetooth technology has become popular, access to portable Bluetooth speakers has become easier. Accordingly, the use of a portable Bluetooth speaker may be considered to configure a 5.1-channel surround sound system. A 5.1 channel surround sound system includes six speakers located at specific locations. That is, among the six 5.1 channel surround speakers, the specific locations where the speakers located to the user's left and right should be located are as follows.

Front left (FL) speaker: The angle formed by the TV, person, and speaker must satisfy 30 degrees.

Front right (FR) speaker: The angle between the TV, person, and speaker must satisfy 30 degrees.

Rear left (RL) speaker: The angle formed by the TV, person, and speaker must satisfy 110 degrees.

Rear right (RR) speaker: The angle formed by the TV, person, and speaker must satisfy 110 degrees.

When broadcast streaming audio data using the method defined in the Bluetooth low energy audio standard, a lot of bandwidth (BW) resources may be wasted in periodic advertising (PA). More specifically, during broadcast streaming, PA is metadata that must always be transmitted at any moment for any receiver, so PA may be needed when the sink device first receives streaming, but PA reception may be unnecessary after the sink device's initial streaming reception. However, the existing audio data streaming process is configured so that PA transmission is periodically repeated even after the sink device's initial streaming reception, so repeated transmission of PA becomes a waste of BW resources. Therefore, in order to solve the problem of BW resource waste due to repetitive PA transmission that exists in existing audio data streaming methods, the present disclosure proposes a method for performing audio data streaming without BW resource waste due to repetitive PA transmission.

First, before explaining the methods proposed in the present disclosure, the 5.1 channel surround sound system will be described.

FIG. 6 is a diagram illustrating an example of a 5.1 channel surround sound system consisting of a TV and speakers.

Referring to FIG. 6, a block diagram of a TV 610 and speakers 620 and speakers 621 are illustrated.

First, the TV 610 includes a video display, an audio decoder and an audio encoder, a controller, and a BLE transmission interface (Tx interface), and the video display, the audio decoder, and the audio encoder are functionally connected to the controller. The audio decoder of the TV 610 receives an audio stream and performs pulse-code modulation (PCM) data decoding in each of the six channels. The audio stream may be a Dolby 5.1 channel stream or a DTS 5.1 channel stream.

PCM streams decoded through PCM data decoding are encoded through LC3, a Bluetooth LE audio codec. The six encoded streams are delivered to the BLE transmission interface of the TV 610, and the BLE transmission interface can transmit the six delivered streams to the BLE reception interface (Rx interface) of the speaker 620.

Next, the six speakers 620 in FIG. 6 constitute a 5.1-channel surround sound system, and the six speakers 620 may include FL, FR, C, RL, RR, and W speakers. The meanings of the abbreviations such as FL and FR are as follows.

FL (Front Left): Left

FR (Front Right): Right

C (Center): Center

RL (Rear Left): Left Surround

RR (Rear Right): Right Surround

W (Woofer): Low Frequency Effect

The block diagram 621 of the speaker may be commonly applied to the six speakers.

The speaker block diagram 621 may include a BLE transmission/reception (Tx/Rx) interface, audio decoder, speaker driver, and controller. The BLE transmission/reception interface may be functionally connected to the controller. FIG. 6 illustrates a case where there are 6 speakers, but if there are speakers built into the TV itself, a 5.1-channel surround sound system can be configured using fewer speakers.

For example, if there are two speakers, depending on the user's selection, the two speakers can be used as Rear Left and Rear Right, and the speakers built into the TV can be used as Front Left and Front Right.

As another example, if there are three speakers, depending on the user's selection, the three speakers can be used as Rear Left, Rear Right, and Woofer, and the speakers built into the TV can be used as Front Left and Front Right.

As another example, if there are 5 speakers, depending on the user's selection, the five speakers can be used as Rear Left, Rear Right, Woofer, Front Left, and Front Right, and the speaker built into the TV can be unused or used as a center.

As shown in FIG. 6, if there are six speakers, depending on the user's selection, the six speakers can be used as Rear Left, Rear Right, and Woofer, as well as Front Left, Front Right, and Center, and the speakers built into the TV may not be used.

Additionally, even in the case of 2-channel or 2.1-channel, non-surround sound, external speakers can be used as Left, Right, and Woofer.

FIG. 7 is a flowchart illustrating an example of an operation performed between a TV with built-in speakers and two speakers in a 5.1-channel surround sound system.

In FIG. 7, the TV 901 has built-in FL and FR speakers, and C speakers can be optionally built-in. The TV 901 is an initiator, and the speakers can act as acceptors.

S910: The first speaker 902 and the second speaker 903 transmit an advertising message using the general announcement (GA) method or the target announcement (TA) method. Here, the GA may refer to an operation method of broadcasting an advertising message containing simple information indicating that the device is provided or ready to provide a specific service. In addition, the TA may refer to an operation method of setting and transmitting an address so that a specific central device can receive an advertising message including information such as the device's role (RR or RL) and decoder performance. The TV 901 receives advertising messages transmitted to the GA or TA from the first speaker 902 and the second speaker 903, respectively. Afterwards, the TV 901 can set the speakers built into the TV as FL speakers, FR speakers, or C speakers in a 5.1-channel surround sound system. The TV 901 can identify the locations of the first speaker 902 and the second speaker 903 based on the advertising message transmitted in the TA method.

S920: The TV 901 transmits a connection request message to the first speaker 902 and the second speaker 903.

Afterwards, the TV 901 can set its role to operate as a central device, when it receives an advertising message using the TA method in step S910, it may set the role of the first speaker 902 to peripheral (RR) based on the advertising message, and the role of the second speaker 903 to peripheral (RL). Alternatively, the TV 901 can identify the locations of the first speaker 902 and the second speaker 903 through the published audio capability (PAC) discovery procedure in the connection step with the first speaker 902 and the second speaker 903. Based on the identified location, the TV 901 can set the role of the first speaker 902 to peripheral (RR) and the role of the second speaker 903 to peripheral (RL). Step S920 may be performed at the GATT layer.

S930: The TV 901 transmits a message requesting CIS channel formation to the first speaker 902 and the second speaker 903, respectively, to form a CIS channel between the first speaker 902 and the second speaker 903. The CIS channel may be a unicast channel. Here, the TV 901 may correspond to a master device, and the first speaker 902 and the second speaker 903 may correspond to slave devices. Afterwards, a first CIS channel between the TV 902 and the first speaker 902 and a second CIS channel between the TV 902 and the second speaker 903 may be formed, and the first CIS channel and the second CIS channel may be grouped into one CIG. The TV 901 may transmit the audio stream of the content the user is watching to each of the first speaker 902 and the second speaker 903 in a unicast manner through the formed first CIS channel and second CIS channel. Step S930 may be performed at the link layer.

FIG. 8 is a flowchart illustrating an example of an operation performed between a TV with built-in speakers and two speakers in a 5.1-channel surround sound system.

In FIG. 8, the TV 1001 may have built-in FL and FR speakers, and a C speaker can be optionally built-in. The TV 1001 may be an initiator, and the speakers may act as acceptors.

S1010: The first speaker 1002 and the second speaker 1003 transmit an advertising message using the general announcement (GA) method or the target announcement (TA) method. Here, the GA may refer to an operation method of broadcasting an advertising message containing simple information indicating that the device is provided or ready to provide a specific service. In addition, the TA may refer to an operation method of setting and transmitting an address so that a specific central device can receive an advertising message containing information such as the device's role (RR or RL) and decoder performance. The TV 1001 receives advertising messages transmitted to the GA or TA from the first speaker 1002 and the second speaker 1003, respectively. Afterwards, the TV 1001 can set the speakers built into the TV as FL speakers, FR speakers, or C speakers in a 5.1-channel surround sound system. The TV 1001 can identify the locations of the first speaker 1002 and the second speaker 1003 based on the advertising message transmitted in the TA method.

S1020: The TV 1001 transmits a connection request message to the first speaker 1002 and the second speaker 1003. Afterwards, the TV 1001 can set its role to operate as a central device, when it receives an advertising message using the TA method in step S1010, it may set the role of the first speaker 1002 to peripheral (RR) based on the advertising message, and the role of the second speaker 1003 to peripheral (RL). Alternatively, the TV 1001 can identify the locations of the first speaker 1002 and the second speaker 1003 through the published audio capability (PAC) discovery procedure in the connection step with the first speaker 1002 and the second speaker 1003. Based on the identified location, the TV 1001 can set the role of the first speaker 1002 to peripheral (RR) and the role of the second speaker 1003 to peripheral (RL). Step S1020 may be performed at the GATT layer.

S1030: The TV 1001 forms a BIS channel between the first speaker 1002 and the second speaker 1003. The BIS channel may be a broadcast channel. Here, the TV 1001 may correspond to a master device, and the first speaker 1002 and the second speaker 1003 may correspond to slave devices. The TV 1001 can broadcast the audio stream of the content the user is watching to the first speaker 1002 and the second speaker 1003 through the formed BIG channel. Step S1030 may be performed at the link layer.

FIG. 9 is a diagram illustrating examples of data packet formats transmitted through a BIS channel.

FIG. 9 (*a*) relates to an example in which a data packet is configured to include two BIS streams in one BIG.

In FIG. 9 (*a*), when an RR BIS event occurs, an indicator (RR) indicating that it is a data packet for the RR speaker, a time stamp, and a sequence number (seq #) are included in the header, RR channel audio data packet is included in the payload, and BIS stream is transmitted. After a certain period of time, when an RL BIS event occurs, an indicator (RL) indicating that it is a data packet for the RL speaker, a time stamp, and a sequence number (seq #) are included in the header, RR channel audio data packet is included in the payload, and BIS stream is transmitted.

FIG. 9(*b*) relates to an example in which a data packet is configured to include one BIS stream in one BIG.

In FIG. 9(*b*), one BIS includes all of a header and audio data packet for the RR speaker and a header and audio data packet for the RL speaker. Here, an indicator (RR/RL) indicating that it is a data packet for an RR/RL speaker, a time stamp, and a sequence number (seq #) may be included in each header.

Table 2 below shows the fields included in a data packet in PAC format and their description.

TABLE 2

| Field | Description |
|---|---|
| Direction | This field takes a single value, either Sink or Source. |
| Codec ID | This field takes a single value, which is the codec identifier defined in the Bluetooth Assigned Numbers. |
| Audio Location | List of Audio Locations. This list has a minimum of one entry. Each entry may be a combination of Audio Locations. |
| Channel Mode | List of Channel modes. This list has a minimum of one entry. |
| Sampling Frequency | List of Sampling Frequencies. This list has a minimum of one entry. |
| Codec-specific parameters | Variable-size codec-specific parameters defined by a profile. May be empty. |
| Content protection type | This field takes a single value, which is the content protection types defined in Bluetooth Assigned Numbers. |
| Content protection type specific value | Variable-size content protection type specific value defined by a profile. May be empty. |

Extended Advertising

The EA transmitted by a Broadcast Source consists of ADV_EXT_IND PDUs, auxiliary AUX_ADV_IND PDUs, and optional auxiliary AUX_CHAIN_IND PDUs. EA PDUs contain an Extended Header Field.

The ADV_EXT_IND PDU Extended Header field contains an AuxPtr field that contains data that enables synchronization to auxiliary AUX_ADV_IND PDUs. The ADV_EXT_IND PDU AuxPtr field points to the AUX_ADV_IND.

The AUX_ADV_IND PDU Extended Header field contains a SyncInfo field that contains data that enables synchronization to a PA. The AUX_ADV_IND PDU SyncInfo field points to the PA.

The AUX_ADV_IND PDU Extended Header field contains an AdvData field that contains the Service Data AD data type. The Service Data AD data type contains the Broadcast Audio Announcement Service UUID and the Broadcast_ID. The Broadcast Audio Announcement Service UUID associates the PA being pointed to with a BIG that contains one or more BISes used to transport broadcast Audio Streams. The Broadcast_ID assists scanning devices that are not using a Filter Accept List to determine that the EA points to the PA that points to the BIG of interest.

If AUX_CHAIN_IND PDUs are used, the AUX_ADV_IND PDU Extended Header field contains an AuxPtr field that contains data that enables synchronization to auxiliary AUX_CHAIN_IND PDUs. The AUX_ADV_IND PDU AuxPtr field points to one or more AUX_CHAIN_IND PDUs. AUX_CHAIN_IND PDUs are used at the discretion of the Bluetooth Controller.

The ADV_EXT_IND PDUs and their auxiliary AUX_ADV_IND PDUs, including any auxiliary AUX_CHAIN_IND PDUs present, form an advertising set. The advertising set has an Advertising Set ID, SID, The SID value is carried in the SID subfield of the ADI field of the Extended Header field of ADV_EXT_IND PDUs and AUX_ADV_IND PDUs and, if used, AUX_CHAIN_IND PDUS.

Periodic Advertising

The PA transmitted by a Broadcast Source consists of AUX_SYNC_IND PDUs and optional auxiliary AUX_CHAIN_IND PDUs. PA PDUs contain an Extended Header Field.

If AUX_CHAIN_IND PDUs are used, the superior AUX_SYNC_IND PDUs Extended Header field contains an AuxPtr field that contains data that enables synchronization to auxiliary AUX_CHAIN_IND PDUs. The AUX_SYNC_IND PDU AuxPtr field points to one or more AUX_CHAIN_IND PDUs. AUX_CHAIN_IND PDUs are used at the discretion of the Bluetooth controller.

The AUX_SYNC_IND PDU Extended Header field and/or AUX_CHAIN_IND PDU Extended Header field may carry an AdvData field that contains the Service Data AD data type. If present, the Service Data AD data type contains the Basic Audio Announcement Service UUID, followed by the BASE configuration that describes one or more broadcast Audio Streams.

The AUX_SYNC_IND PDU Extended Header field and/or AUX_CHAIN_IND PDU Extended Header field may carry an ACAD field that contains the BIGInfo. The BIGInfo data enables synchronization to a BIG that contains one or more BISes used to transport broadcast Audio Streams. The BIGInfo therefore provides information that enables reception of a broadcast Audio Stream. The BIGInfo points to the BIG.

FIG. 10 illustrates an example of an operation in which a source device transmits audio data to a sink device. More specifically, FIG. 10 is a diagram illustrating an example of a message sequence of a periodic advertising message performed when exchanging information required for initial streaming between the source device and the sink device.

First, the source device transmits an (AUX_EXT_IND type) advertising message including an advertising PDU of AUX_EXT_IND (indication) type through a primary physical advertising channel (1010). The advertising message may be an extended advertising message. Additionally, the primary physical advertising channel may be channels 37 to 39, and the advertising message may include channel information on which an extended advertising message is transmitted. The extended advertisement message may include at least one of the AdvAddr, ADI, Aux Ptr, ADId, Ch #_Aux_Adv, and Offset fields based on the event type related to transmission of the extended advertisement message. Aux Ptr included in the advertisement message may indicate when the extended advertisement message to be transmitted later is transmitted.

Next, the source device transmits an (AUX_ADV_IND type) advertising message including an advertising PDU of the AUX_ADV_IND type through a secondary physical advertising channel (1020). The advertising message may be an extended advertising message. Additionally, the secondary physical advertising channel may be channels 0 to 36. The advertising message transmitted on the secondary physical advertising channel may include ADI, synchronization information (syncinfo), AdvData field, etc. Aux Ptr included in the advertising message may indicate when the AUX_CHAIN_IND type advertising message to be transmitted later is transmitted, and the AUX_CHAIN_IND type advertising message may include ADI, AdvData fields, etc. Additionally, Syncinfo included in the advertising message may indicate when a periodic advertising message of the AUX_SYNC_IND type to be transmitted later is transmitted.

Next, the source device periodically transmits an (AUX_SYNC_IND type) advertising message including an advertising PDU of the AUX_SYNC_IND type (1030). The advertising message may be an expanded advertising message. The advertising message may include Aux Ptr, ACAD (BIG info), and AdvData fields. The AdvData field may include Broadcast Audio Source Endpoint (BASE), broadcast TV metadata, etc. Additionally, Aux Ptr of the advertising message may indicate when the periodic advertising message of the AUX CHAIN_IND type is transmitted. The periodic advertising message of the AUX CHAIN_IND type may include an AdvData field, and the AdvData field may include Broadcast Audio Source Endpoint (BASE), broadcast TV metadata, etc. Additionally, BIG info of the AUX_SYNC_IND type advertising message may indicate when a broadcast isochronous stream (BIS) is transmitted.

Afterwards, the source device transmits a broadcast isochronous stream (BIS) (or audio data) to the sink device (1040). The broadcast isochronous stream may consists of a data event for audio data related to the broadcast audio streaming service provided by the source device and a control event including control information for providing the audio streaming service. The data event may include at least one of the BIS data and may be transmitted periodically through an isochronous channel.

As described in FIG. 10, audio data streaming is proceeded in such a way that the sink device obtains both BIGInfo and BASE required for audio data streaming through periodic advertising messages, and then BIS transfer is performed. At this time, after the sink device obtains both BIGInfo and BASE required for audio data streaming, the pattern in which BIS transfer is performed does not end as a one-time event, but is repeated in the same way in the entire broadcast session (1005). In the case of a 5.1-channel surround audio system, although there are rare cases where it is necessary to change the IGInfo and BASE obtained by the sink device, in the existing audio data streaming method, periodic advertising messages are transmitted unnecessarily repeatedly, which acts as a waste of bandwidth resources. Additionally, the shorter the transmission period of periodic advertising messages, the greater the waste of bandwidth resources.

The present disclosure proposes a method in which a source device transmits/set up information required for broadcast streaming to a sink device through a unicast method in order to eliminate waste of bandwidth resources due to repeated transmission of periodic advertising messages. Through the method proposed in the present disclosure, there is an effect of saving resources wasted due to periodic advertising message transmission. In addition, through the method proposed in the present disclosure, since management of whether or not data packets are transmitted in periodic advertising message transmission becomes unnecessary, there is an effect of allowing broadcast streaming operations to be performed efficiently. The method proposed in the present disclosure will be described in detail with reference to FIG. 11.

FIG. 11 is a diagram illustrating an example in which a method proposed in the present disclosure is performed between a source device and a sink device.

The audio data broadcast streaming method between the source device and the sink device may include (1) a unicast-based setup step (S1110) and (2) a broadcast streaming step for streaming audio data after completing setup (S1120). Here, in order to set up audio data broadcast streaming without repeated transmission of periodic advertising messages, information for setting up the sink device transmitted and included in the periodic advertising message may be transmitted in step S1110. At this time, in a 5.1 channel surround environment, the sink device and the source device can be connected to each other based on the unicast method, so information for setting the sink device can be transmitted using the unicast method-based connection between the sink device and the source device.

Below, the method proposed in the present disclosure will be described in more detail, and operations performed from the perspective of the source device will be described for convenience of explanation, but the method proposed in the present disclosure cannot be interpreted as applying only to the operation of the source device, and it goes without saying that it can be equally applied to the operation of the sink device.

First, the source device may form a connection (unicast) with the sink device (S1100). The source device performs a setup procedure to transmit the audio data with the sink device based on the formed connection (S1110). More specifically, in step S1100, the source device and the sink device exchange information for setting a codec for audio data broadcast streaming (S1111). Additionally, in step S1100, the source device and the sink device exchange information for setting quality of service (QoS) for audio data broadcast streaming (S1113). Thereafter, the source device transmits, to the sink device, timing information on the transmission timing of audio data in audio data broadcast streaming and metadata information for transmission of the audio data (S1115). Here, timing information on the transmission timing of the audio data may be BIGinfo, and the metadata information may be BASE. In step S1110, although not shown in FIG. 11, the source device may further receive, from the sink device, a notification message indicating that setup of the sink device based on the timing information and the metadata information has been completed. As the source device receives the notification message, the source device can transmit audio data to the sink device only when settings for audio data broadcast streaming have been completed, which has the effect of improving the reliability of audio data broadcast streaming.

Next, audio data broadcast streaming is performed between the source device and the sink device (S1120). More specifically, based on the source device having already set timing information on the transmission timing of the audio data in step S1110 and metadata information for transmission of the audio data to the sink device, broadcast isochronous stream (BIS) is transmitted to the sink device without transmitting periodic advertising messages for transmission of the timing information and the metadata information (S1121).

At this time, the metadata information may further include information for setting codec used to output the audio data by the sink device, and may further include information on the number of channels for transmission of the audio data. Additionally, the metadata information may further include information on video data related to the audio data.

Additionally, although not shown in FIG. 11, after steps S1120 and S1121, the source device may receive, from the sink device, a message requesting a change in the setup of the sink device preset based on the setup procedure. At this time, whether the change in the setup needs can be determined in the sink device. For example, if the sink device measures channel state for the audio data broadcast streaming, and determines that the preset settings are no longer appropriate in the channel state as a result of channel state measurement, the sink device may transmit a message requesting the change in the setup to the source device. At this time, the transmission of the audio data may be stopped based on the reception of the message requesting a change in the setup of the sink device. When transmission of audio data is stopped, the source device may perform a setup change procedure to change setup of the sink device and the sink device. At this time, the source device may further receive, from the sink device, a notification message indicating that change of the setup of the sink device has been completed. Thereafter, the source device may transmit, to the sink device, the audio data based on the changed setup of the sink device.

Hereinafter, a method of configuring characteristics for implementing the method proposed in the present disclosure will be described with reference to FIG. 12.

FIG. 12 is a diagram illustrating examples for characteristic configurations for implementing a method proposed in the present disclosure.

First, referring to (a) of FIG. 12, in a procedure based on an existing control point characteristic, a setup procedure for audio data broadcast streaming may be added through a unicast connection between the source device and the sink device. By adding a setup procedure for audio data broadcast streaming to the existing control point characteristic, BIGinfo and BASE transmission operations for audio data broadcast streaming may be performed based on control point characteristic defined in the source device and sink device. According to the present embodiment, most of the information included in BIGInfo and BASE can be transmitted without change, and the procedures added to the control point characteristic can be called "Send BIGInfo" and "BASE Procedure". At this time, a command for transmitting the BIGInfo value and BASE value can be added through a control point command.

Next, referring to (b) of FIG. 12, a separate characteristic for performing a setup procedure for audio data broadcast streaming through a unicast connection between the source device and the sink device may be newly defined. That is, a separate characteristic for transmitting BIGinfo and the BASE may be defined for the source device and the sink device, respectively. At this time, the characteristic for BIGinfo transmission may be called BIGInfo characteristic, and the characteristic for BASE transmission may be called BASE characteristic. According to the present embodiment, the source device can write BIGInfo and BASE values in the BIGInfo characteristic and BASE characteristic, respectively. In this operation, the source device may be understood as a central device or client device, and the sink device may be understood as a peripheral device or server device.

BIGInfo is included in the AUX_SYNC_IND packet during periodic advertising. That is, if BIGInfo is transmitted as part of a periodic advertisement message rather than through the unicast-based method proposed in the present disclosure, BIGInfo may be included in the AUX_SYNC_IND packet of the periodic advertisement message. Information included in BIGInfo includes ISO Channel setting information of the Air Interface, offset timing information with AUX_SYNC_IND, and encryption information. Here, ISO Channel setting information may include information such as ISO_Interval, Sub_Interval, Number of Sub Events (NSE), Burst Number (BN), Pre-Transmission Offset (PTO), Immediate Repetition Count (IRC), PHY, Framing and Channel map. Here, the NSE is the number of sub-events transmitted in one time interval in which broadcast audio streaming is performed, and may have the same value as the number of sub intervals. Additionally, the BN indicates the number of new events transmitted in one time interval in which broadcast audio streaming is performed. The IRC defines the number of groups delivering data related to the current event.

The offset timing information may include information such as BIG_Offset and BIG_Offset_Units. Additionally, BIGInfo further includes information for encryption of broadcast transmission.

BASE, like BIGInfo, is included in the AUX_SYNC_IND packet of the periodic advertising message.

BASE includes metadata at the application level and has values such as codec setting, the number of channels, and program information. In particular, codec setting values, the number of channels, etc. may be important information in a 5.1-channel surround audio system.

FIG. 13 is a flowchart illustrating an example of a source device operation performing a method proposed in the present disclosure.

More specifically, the source device forms a connection with a sink device (S1310).

Next, the source device performs, based on the formed connection, a setup procedure for transmitting the audio data with the sink device (S1320).

Afterwards, the source device transmits the audio data to the sink device based on the setup procedure (S1330).

Here, the performing the setup procedure further includes transmitting, from the source device to the sink device, timing information on transmission timing of the audio data and metadata information for transmission of the audio data, and the audio data is transmitted without transmission of periodic advertisement messages for transmission of the timing information and the metadata information.

In addition, the source device includes a transmitter configured to transmit a wireless signal; a receiver configured to receive a wireless signal; at least one processor; and at least one computer memory operably connected to the at least one processor, and storing instructions for performing operations when being executed by the at least one processor, wherein the operations may include the operations performed in FIG. 13.

It is obvious to those skilled in the art that the present disclosure can be embodied in other specific forms without departing from the essential features of the present disclosure. Accordingly, the above detailed description should not be construed as restrictive in all respects and should be considered illustrative. The scope of the present disclosure should be determined by reasonable interpretation of the appended claims, and all changes within the scope of equivalents in the present disclosure are included within the scope of the present disclosure.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

It is obvious to those skilled in the art that the present disclosure can be embodied in other specific forms without departing from the essential features of the present disclosure. Accordingly, the above detailed description should not be construed as restrictive in all respects and should be considered illustrative. The scope of the present disclosure should be determined by reasonable interpretation of the appended claims, and all changes within the scope of equivalents in the present disclosure are included within the scope of the present disclosure.

INDUSTRIAL APPLICABILITY

Above, the preferred embodiments of the present disclosure described above are disclosed for illustrative purposes, and those skilled in the art will be able to improve, change, replace, or add various other embodiments within the technical spirit and technical scope of the present disclosure disclosed in the appended claims.

What is claimed is:

1. A method for transmitting audio data by a source device in a short-range wireless communication system, the method comprising:

forming a connection with a sink device;

based on the formed connection, performing a unicast-based setup procedure for transmitting the audio data with the sink device; and transmitting the audio data as audio data broadcast streaming to the sink device based on the setup procedure, wherein the performing the setup procedure further includes exchanging information for setting a codec for the audio data broadcast streaming, exchanging information for setting quality of service (QoS) for the audio data broadcast streaming, transmitting, to the sink device, timing information on transmission timing of the audio data and metadata information for transmission of the audio data, wherein the timing information is Broadcast Isochronous Group Information (BIGInfo) and the metadata information is Broadcast Audio Source Endpoint (BASE), and wherein information for setting up the sink device transmitted and included in a periodic advertising message is transmitted in the setup procedure using a unicast method-based connection between the sink device and the source device, and wherein the audio data is transmitted without transmission of periodic advertisement messages for transmission of the timing information and the metadata information.

2. The method of claim 1, wherein the BASE includes information for setting a codec used to output the audio data by the sink device and information on a number of channels for transmission of the audio data.

3. The method of claim 2, wherein the BASE further includes information on video data related to the audio data.

4. The method of claim 1, wherein the BIGInfo further includes channel setup information for transmission of the audio data broadcast streaming.

5. The method of claim 4, wherein the channel setup information includes (i) information on time interval of channels for transmission of the audio data, (ii) information on sub-time intervals constituting the time interval, (iii) information on a number of the sub-time intervals included in the time interval, and (iv) information on a number of new events transmitted in the time interval.

6. The method of claim 5, wherein the BIGInfo further includes encryption information for encrypting the audio data.

7. The method of claim 1, wherein the transmitting the BIGInfo and the BASE to the sink device is performed based on a control point characteristic defined in the source device and the sink device.

8. The method of claim 1, wherein a separate characteristic for transmitting the BIGInfo and the BASE to the sink device is defined in the source device and the sink device.

9. The method of claim 1, further comprising:

receiving, from the sink device, a notification message indicating that setup of the sink device based on the BIGInfo and the BASE has been completed.

10. The method of claim 9, further comprising:

receiving, from the sink device, a message requesting a change in the setup of the sink device based on the setup procedure.

11. The method of claim 10, wherein the transmission of the audio data is stopped based on the reception of the message requesting a change in the setup of the sink device.

12. The method of claim 11, further comprising:

performing a setup change procedure to change setup based on the message requesting the change in the setup of the sink device; and receiving, from the sink device, a notification message indicating that change of the setup of the sink device has been completed.

13. The method of claim 12, further comprising:

transmitting, to the sink device, the audio data based on the changed setup of the sink device.

14. A source device that transmits audio data in a short-range wireless communication system comprising:

a transmitter configured to transmit a wireless signal;

a receiver configured to receive a wireless signal;

at least one processor; and at least one computer memory operably connected to the at least one processor, and storing instructions for performing operations when being executed by the at least one processor, wherein the operations includes:

forming a connection with a sink device;

based on the formed connection, performing a unicast-based setup procedure for transmitting the audio data with the sink device; and transmitting the audio data as audio data broadcast streaming to the sink device based on the setup procedure, wherein the performing the setup procedure further includes exchanging information for setting a codec for the audio data broadcast streaming, exchanging information for setting quality of service (QoS) for the audio data broadcast streaming, transmitting, to the sink device, timing information on transmission timing of the audio data and metadata information for transmission of the audio data, wherein the timing information is Broadcast Isochronous Group Information (BIGInfo) and the metadata information is Broadcast Audio Source Endpoint (BASE), and wherein information for setting up the sink device transmitted and included in a periodic advertising message is transmitted in the setup procedure using a unicast method-based connection between the sink device and the source device, and wherein the audio data is transmitted without transmission of periodic advertisement messages for transmission of the timing information and the metadata information.

* * * * *